(12) United States Patent
Kuang et al.

(10) Patent No.: US 8,510,811 B2
(45) Date of Patent: *Aug. 13, 2013

(54) NETWORK TRANSACTION VERIFICATION AND AUTHENTICATION

(75) Inventors: Randy Kuang, Kanata (CA); Stanislus K. Xavier, Kanata (CA)

(73) Assignee: Inbay Technologies, Inc., Kanata, Ontario (CA)

( * ) Notice: Subject to any disclaimer, the term of this patent is extended or adjusted under 35 U.S.C. 154(b) by 397 days.

This patent is subject to a terminal disclaimer.

(21) Appl. No.: 12/639,464

(22) Filed: Dec. 16, 2009

(65) Prior Publication Data

US 2010/0199086 A1 Aug. 5, 2010

Related U.S. Application Data

(60) Provisional application No. 61/149,501, filed on Feb. 3, 2009, provisional application No. 61/183,830, filed on Jun. 3, 2009, provisional application No. 61/247,223, filed on Sep. 30, 2009, provisional application No. 61/248,047, filed on Oct. 2, 2009.

(51) Int. Cl.
*G06F 21/00* (2006.01)
(52) U.S. Cl.
USPC ....... 726/5; 726/7; 726/10; 713/156; 713/186
(58) Field of Classification Search
USPC .............................................. 713/182; 726/5
See application file for complete search history.

(56) References Cited

U.S. PATENT DOCUMENTS

| | | | |
|---|---|---|---|
| 7,475,247 B2 | 1/2009 | Bade et al. | |
| 7,516,483 B2 | 4/2009 | Brennan | |
| 7,562,385 B2 | 7/2009 | Thione et al. | |
| 7,565,536 B2 | 7/2009 | Vassilev et al. | |
| 2003/0037261 A1 | 2/2003 | Meffert et al. | |

(Continued)

FOREIGN PATENT DOCUMENTS

WO   WO 2008/024454 A1   2/2008

OTHER PUBLICATIONS

Ann Cavoukian, "Privacy by Design . . . Take the Challenge," retrieved from the Internet on Dec. 4, 2009, 2 pages http://www.privacybydesign.ca/publications.htm.

(Continued)

*Primary Examiner* — Gilberto Barron, Jr.
*Assistant Examiner* — Devin Almeida
(74) *Attorney, Agent, or Firm* — IP-Mex Inc.; Victoria Donnelly

(57) ABSTRACT

A two-level authentication system is described supporting two-factor authentication that offers efficient protection for secure on-line web transactions. It includes a global unique identity (UID) provided either by an institute-issued/personal trusted device, or based on client computing platform hardware attributes, and generated using institution authorized private software, institution-authorized authentication proxy software, and an institution-generated credential code which is pre-stored in the token and only accessible by the institute-authorized authentication proxy software. The institution-authorized authentication proxy software uses the user's PIN and the trusted device's UID as input and verifies the user and device identities through institution-generated credential code which was pre-stored in the trusted device. Authentication is performed in two levels: the first authenticates the user and the trusted device locally; and the second authenticates the user remotely at the institution-owned authentication server. Various embodiments add extra levels of security, including one-time-password management.

20 Claims, 6 Drawing Sheets

(56) References Cited

U.S. PATENT DOCUMENTS

| | | |
|---|---|---|
| 2006/0041933 A1 | 2/2006 | Yakov et al. |
| 2007/0056025 A1 | 3/2007 | Sachdeva et al. |
| 2007/0250920 A1 | 10/2007 | Lindsay |
| 2008/0028206 A1 | 1/2008 | Sicard et al. |
| 2008/0059804 A1* | 3/2008 | Shah et al. .......... 713/186 |
| 2008/0162925 A1 | 7/2008 | Okaya |
| 2008/0212771 A1 | 9/2008 | Hauser |
| 2008/0222299 A1 | 9/2008 | Boodaei |
| 2008/0229402 A1 | 9/2008 | Smetters et al. |
| 2009/0132808 A1 | 5/2009 | Baentsch et al. |
| 2009/0198618 A1 | 8/2009 | Chan et al. |

OTHER PUBLICATIONS

Dawei Zhang, "Network Security Middleware Based on USB Key," Fifth IEEE International Symposium on Embedded Computing, 2008, IEEE Computer Society (pp. 77-81).

Pashalidis, Andreas, Mitchell, Chris, J., "Single Sign-on Using Trusted Platforms", Royal Holloway, University of London, Egham, Surrey, TW20 0EX, United Kingdom, http://www.isg.rhul.ac.uk pp. 1-15.

The International Search Report for Patent Application No. PCT/CA2010/000127, 3 pages.

* cited by examiner

NETWORK TRANSACTION VERIFICATION AND AUTHENTICATION

CROSS-REFERENCE TO RELATED APPLICATIONS

This application claims the benefit of U.S. Provisional Patent Application Ser. No. 61/149,501, filed Feb. 3, 2009, entitled "Method and System for Identity Protection and Transaction Verification through Auto One Time Password (OTP) Management", U.S. Provisional Patent Application Ser. No. 61/183,830, filed Jun. 3, 2009, entitled "Two-level Verification Approach for Two-factor Authentication", U.S. Provisional Patent application Ser. No. 61/247,223, filed Sep. 30, 2009, entitled "Network Transaction Verification and Authentication", and U.S. Provisional Patent Application Ser. No. 61/248,047 filed Oct. 2, 2009, titled "Network Transaction Verification and Authentication," which each are hereby incorporated by reference in their entirety.

FIELD OF THE INVENTION

The invention relates generally to network security systems. More particularly, the invention relates to a system and method for verifying the identity of a user and establishing a secure and mutually trusted connection within a public telecommunications network.

BACKGROUND OF THE INVENTION

On-line web-base services are widely used in today's society, a typical example being on-line banking services. However, problems associated with transaction security have caused serious challenges and risks to institutions and their customers. The increase in identity theft and the resulting financial losses have become major obstacles that institutions have sought to overcome to ensure a secure on-line environment and to maximize the potential benefits and value of on-line services.

Authentication

The traditional way to authenticate a user is to provide a user name and password from the user's client computer. However, this one-factor authentication is not secure enough to protect either the user or the institution from attack by malicious software or malware (including 'Trojan horses') using approaches such as man-in-the-middle (MITM), man-in-the-browser (MITB), and keystroke logging.

A man-in-the-middle (MITM) attack is one in which the attacker intercepts messages in a public key exchange and then retransmits them, substituting his own public key for the requested one, so that the two original parties still appear to be communicating with each other.

Man-in-the-browser (MITB) is a security attack where the perpetrator installs a Trojan horse on a victim's computer that is capable of modifying that user's web transactions as they occur in real time. A man-in-the-browser attack, unlike "phishing", can occur even when the victim enters the Uniform Resource Locator (URL) into the browser independently, without an external prompt. On the surface, transactions take place normally with expected prompts and password requirements. An MITB attack is more difficult to prevent and disinfect, however, because the activity, instead of occurring in an interchange of messages over the public network, takes place between the user and the security mechanisms within that user's browser or client computer.

Two-factor authentication (TFA) is a security process in which the user provides two means of identification, one of which may be a physical token, such as a card, security token or Universal Serial Bus (USB) device, and the other is typically something memorized, such as a security code. In this context, the two factors involved are sometimes spoken of as "something you have" and "something you know".

Although TFA improves the authentication security, its implementation tends to lead to a costly system. In many TFA systems today, the verification of both the physical token and the security code are conducted at a remote authentication server. This approach may require separate protocols to authenticate the physical token identifier and the user security code. Since a centralized authentication server must deal with large volumes of on-line transactions at the same time, this approach also results in scalability issues.

Identity Protection

In a global economy with billions of transactions carried daily over insecure public Internet Protocol (IP) networks, identity protection becomes paramount. Transactions are based on the trust that each party places in the integrity of the other's credentials. Hence there is a need for stronger identity credentials providing better protection from tampering, and enabling safer high-value transactions in areas such as healthcare, and banking operations. The resultant proliferation of identity systems is forcing individuals to become their own identity administrators.

What is needed is a flexible and simple identity protection mechanism that can be used across several service providers, is able to accommodate complex identity relationships, and provides ways to eliminate or mitigate common security vulnerabilities.

Transaction Verification

Organizations are increasingly vulnerable to substantial economic loss from cyber security attacks. In the case of an information security breach, financial institutions in particular can be exposed to significant financial loss, as well as a loss of reputation. In general, the user computer environment is considered to be insecure with potential for a variety of malicious software to be inserted, such as keystroke recorder, Trojan horse, or even screen recorder, etc., able to record a user's keystrokes, redirect critical messages to a fake server, or to effectively "video record" the user computer's screen (buffer). By using a variety of means, hackers are able to steal user's identities. Even worse, local sessions can be hijacked and critical data modified.

Current solutions are largely aimed at improving the network communication security aspects (even though the actual network communication links are secure enough—as long as man-in-the-middle attacks and the like are prevented). However, the bigger problem lies in detecting and preventing attacks on communications within the client platform itself.

The shortcomings of the current systems apply to personal computer clients running browsers, as well as to personal hand-held digital assistants, 'smart-phones', and like network client devices.

What is needed is a cost-effective system having the ability to establish a mutually trusted communication path between institutions and their users, to provide enhanced authentication and verification services in a manner applicable to a wide range of network client devices, and to insulate the transaction from the insecure environment of the user's computer.

SUMMARY OF THE INVENTION

The present disclosure is directed to an efficient system and method for establishing a mutually trusted communication path between institutions and their users, providing enhanced authentication and verification services and insulating the transaction from the insecure environment of the user's computer.

The system may make use of a trusted security module, which includes a proxy service for accessing a network location, authentication credentials for use by the proxy service for authenticating access to the network location, and trusted security module credentials for authenticating access to the proxy service of the trusted security module.

The system also includes a client computing device having a memory for storing instructions and a processor for executing the instructions stored in the memory. The computing device runs a browser for accessing the network location through the proxy service of the trusted security module using the authentication credentials of the trusted security module. Access to the proxy service is authenticated using credentials provided within the trusted security module.

BRIEF DESCRIPTION OF DRAWINGS

Illustrative embodiments will be described with reference to the drawings in which.

DETAILED DESCRIPTION OF THE INVENTION

Figure 1A:
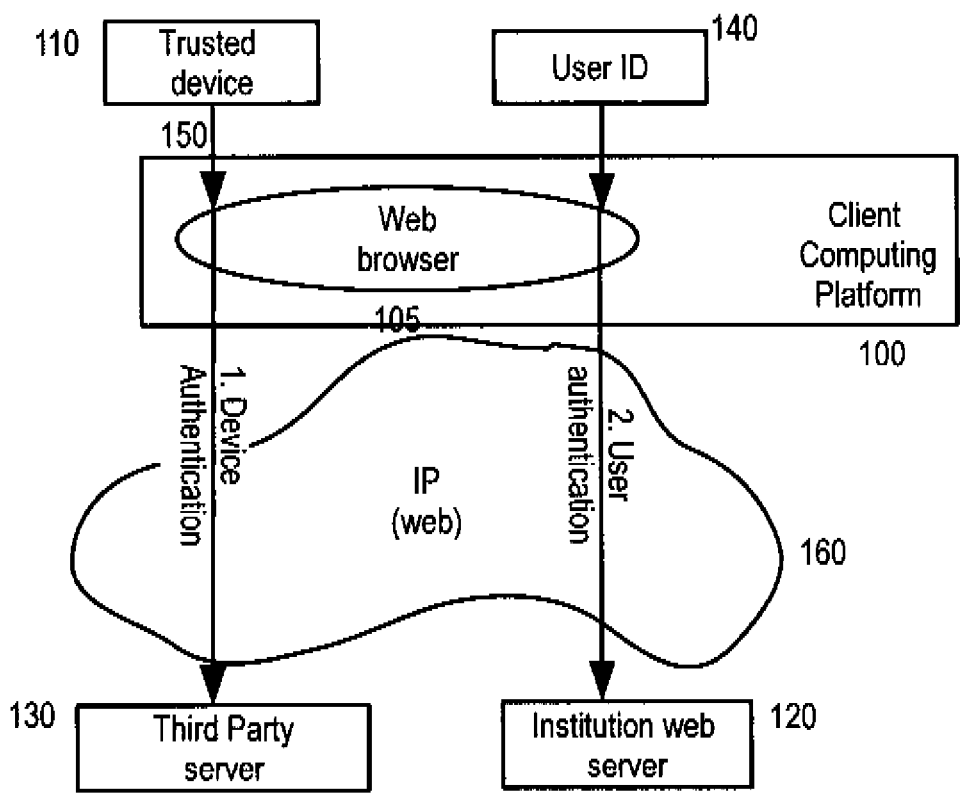
FIG. 1A depicts a prior art implementation of an authorisation system.

Earlier systems, illustrated by FIG. 1A, typically comprise a client computing platform or device 100, containing software, including a web browser 105, to permit communication with an institution web server 120, maintained by an 'on-line service institution', sometimes referred to simply as 'institution'. An institution may include online institutions that require secure, authenticated and trusted communication between the institution and its users. These institutions may include for example a bank, health care provider, or other site with sensitive or personal; information. The browser 106 is also able to communicate with a third party web server 130, capable of authenticating a physical token 110 which is connectable to the client computing platform 100 over a local communications link 150. It will be appreciated that the physical token 110 does not need to be connectable to the client computing platform 100. Instead the authentication information of the physical token 110 may be input into the client computing platform 100 in other ways, such as using wireless communications. Communication between the client computing platform 100 and the web servers 120, 130 takes place over a network, such as the Internet, 160 using an appropriate communication protocol, such as the Internet Protocol (IP). The user's identity is authenticated by the user inputting a personal identification number (PIN)—the User ID 140.

Figure 1B:
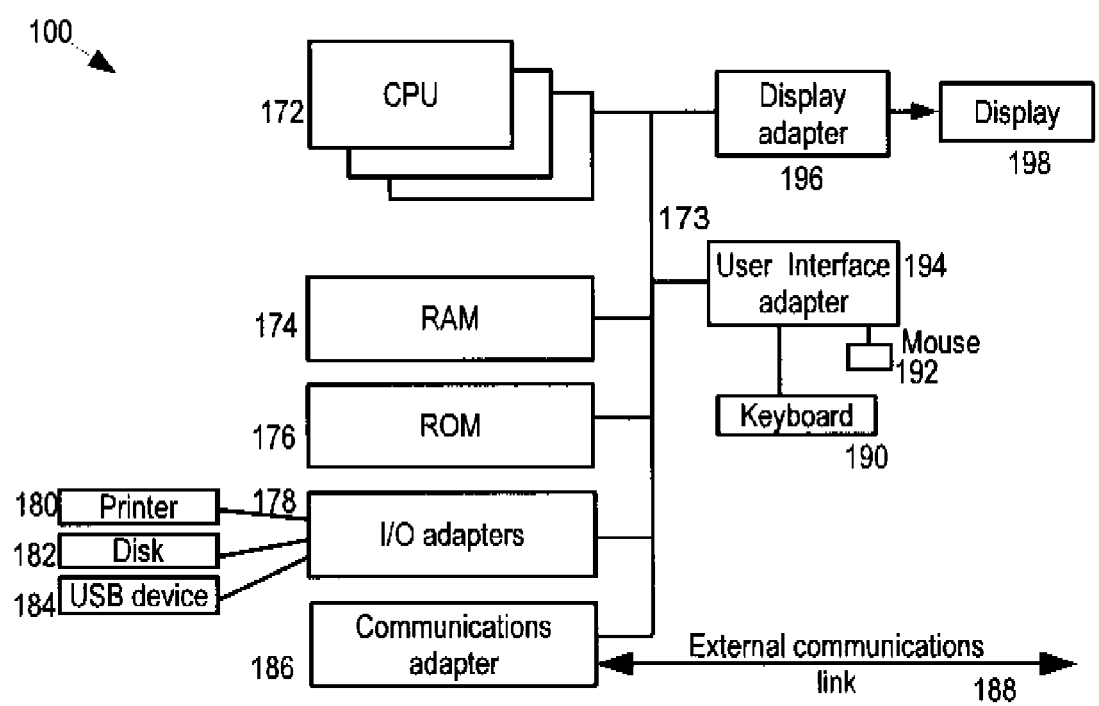
FIG. 1B depicts a prior art implementation of a client computing platform

With reference to FIG. 1B, this depicts a typical computer architecture of a client computing platform in which embodiments of the present invention may be implemented or used. A client computing platform 170 contains one or more central processing units (CPUs) 172 connected to an internal system bus 173, which interconnects random access memory (RAM) 174, read-only memory 176, and an input/output adapter 178, which supports various I/O devices, such as printer 180, disk units 182, USB devices 184, or other devices not shown, such as an audio output system, etc. System bus 173 also connects with a communication adapter 186 that provides access to external communications link 188. User interface adapter 194 connects various user devices, such as keyboard 190 and mouse 192, or other devices not shown, such as a touch screen, stylus, microphone, etc. to the system bus 173. Display adapter 196 connects the system bus 173 to display device 198.

Those of ordinary skill in the art will appreciate that the hardware in FIG. 1B may vary depending on the system implementation. For example, the system may have one or more processors, such as general purpose processors and digital signal processors (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, embodiments of the present invention may be implemented in a variety of software environments. An operating system may be used to control program execution within each platform or device. For example, the computing platform 170 may run one, or more, of a plurality of different operating systems, such as Windows, Mac OS, Linux, Android, Web OS. The client computing platform 170 may include, or be based on, a simple Java runtime environment. A representative computer platform may include a browser such as Internet Explorer, Firefox, Safari, Opera or Chrome, which are a well known software applications for accessing hypertext documents in a variety of formats including text files, graphics files, word processing files, Extensible Markup Language (XML), Hypertext Markup Language (HTML), Handheld Device Markup Language (HDML), and various other formats and types of files.

A first illustrative embodiment comprises a two-level security verification system to support two-factor authentication (TFA) in on-line web transaction services. The security verification system may be used to establish a trusted virtual transaction environment between an on-line user and an on-line service institution, thereby preventing or reducing attacks using various forms of Trojan and other software. Embodiments of the invention are applicable in any environment where multi-factor authentication is desirable.

Figure 2:
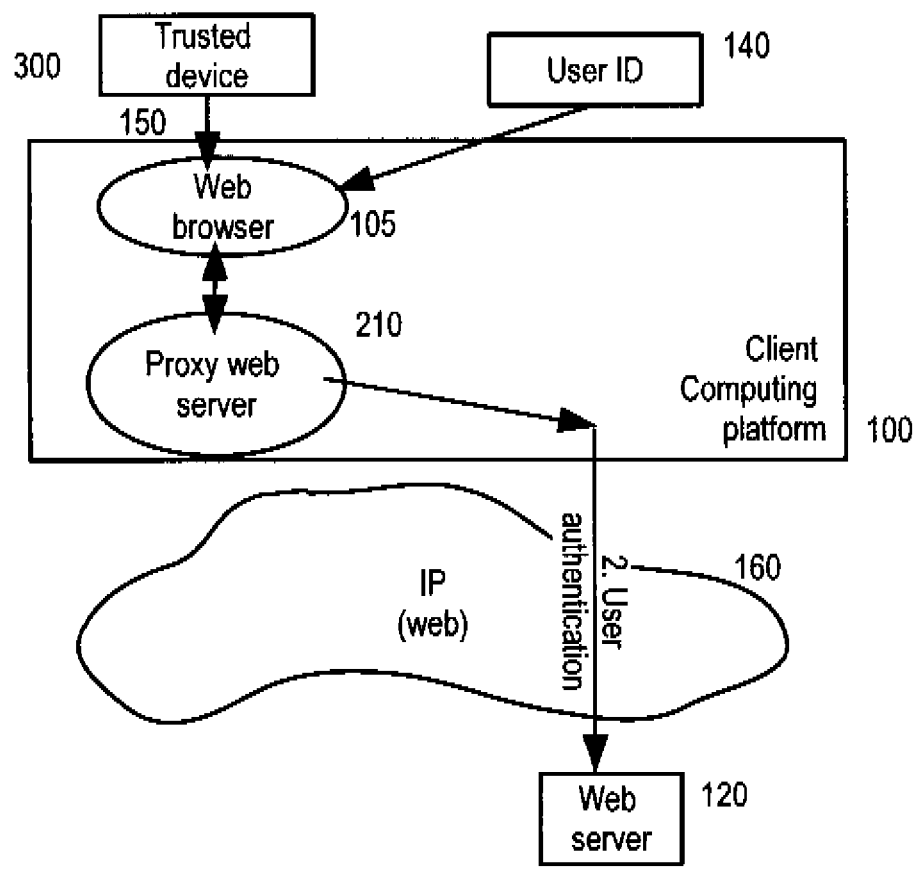
FIG. 2 illustrates one embodiment of the invention, using a physical trusted device.

The two-level security verification system makes use of the architecture illustrated in FIG. 2. Here, in contrast with the prior art shown in FIG. 1A there is no need for a third party server 130 for the physical token 110 based authentication. The trusted device 300 has attributes and features which differentiate it from the physical token 110 used in earlier systems. The trusted device 300 includes a trusted proxy service, which may be implemented by code stored in a memory of the trusted device 110. When the trusted proxy service is implemented, for example by executing the code of the trusted proxy service by the processor 172 of the client computing platform 170, it configures the client computing platform 170 to provide a proxy web server 210. The client computing platform 170 also includes a web browser 105 or other means for accessing a network location, such as an institution web server 120, maintained by an on-line service institution, A User ID 140 may be received at the browser 105 and used to authenticate a user's access to the trusted device 300. The trusted device 300 may be connected to the client computing platform 170 over a local communication link 150, such as a wired or wireless connection. The client computing platform may be connected to the institution web server via a network 160. The browser 105 access the institution web server through the proxy web server 210 in order to provide a trusted communication path between the browser and the institution.

Figure 3:
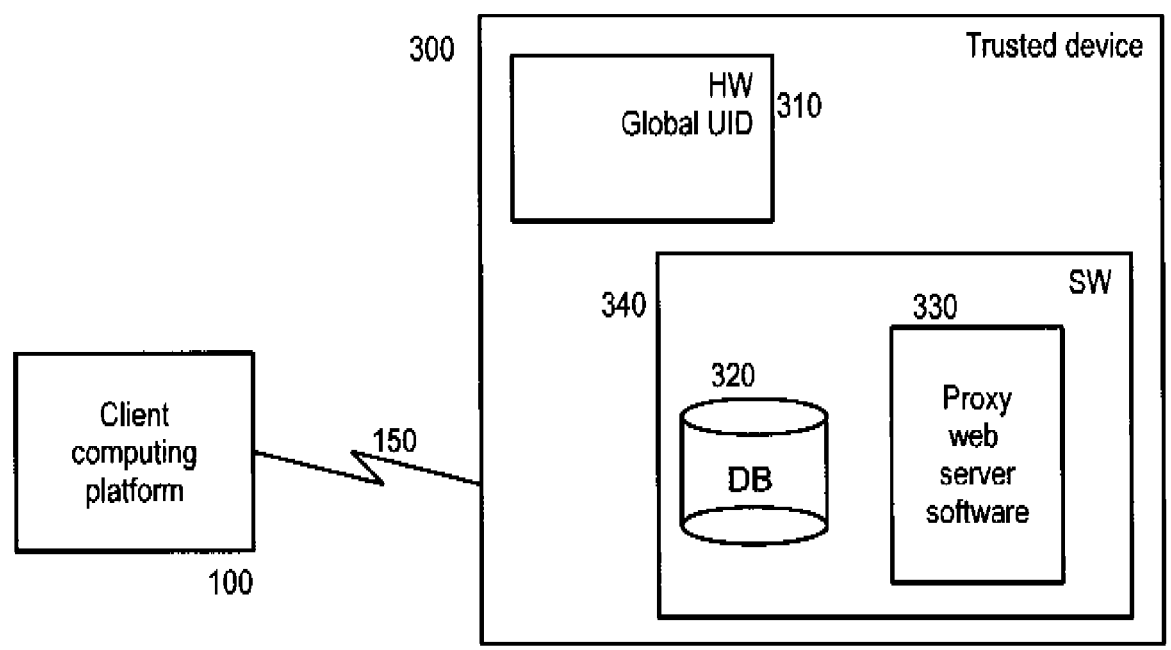
FIG. 3 shows a trusted device for use in an embodiment of the invention.

An illustrative embodiment of a trusted security device 300 is shown in schematic form in FIG. 3. A Global Unique ID (UID) 310 may be created and stored in the device 300. The UID 310 may be stored in encrypted form. The UID 310 is used to uniquely identify the trusted security device 300, in order to ensure that a user physically has the trusted security device 300 when accessing the institution web server.

In some embodiments, the Global UID 310 is generated by an algorithm that is capable of taking device identity information, such as information that is hard-coded into computing hardware of the trusted security device 300, and possibly other data, for example a user selected personal identifier (PIN), as its input and producing the UID as its output. Various software and data elements 340 may also be present in the trusted device 300, including a database 320 and trusted proxy service code 330 that implement the proxy web server when executed. These elements may be present as data and instructions stored in a memory of the trusted device. The trusted device 300 is logically connectable to the client computing platform 100 over the local communication link 150. In some embodiments the local communication link 150 is a Universal Serial Bus (USB) interface, although other connections are possible.

The database 320 and the trusted proxy service 330 may be used to store access credentials of a network location of an institution and access the network location on behalf of the browser 105 using the stored access credentials. As a result a user does not need to enter their institution access credentials into the browser 105.

One illustrative embodiment comprises:
a client computing platform 170 in the form of a network-connected computer;
a trusted device 300, which includes a global unique identifier (UID) 310;
an institution-authorized trusted proxy service 330, stored within the trusted device 300, comprising code for implementing a trusted proxy web server; and
a user credential code stored in the trusted device database 320 for authenticating access to the authentication proxy service.

The trusted device 300 is able to store other data in AN open or secured format. The local communications link 150 between the trusted device 300 and the client computing platform 100 may be physical (e.g. USB, Ethernet) or wireless (e.g. Bluetooth, infra-red, or WiFi) or by other suitable means, including those not yet invented.

Much of the description assumes the trusted device 300 to be a physical device such as a USB flash drive, but it will be recognised that alternative embodiments, in which the trusted proxy service is provided to the client computing platform in other ways.

Credential data used to authenticate user access to the trusted proxy web server provided by the trusted device 300 and the credential data used by the trusted proxy web server 210 for authenticating access to the institution's network location are stored in the database 320 of the trusted device 300. The database 320 may be protected by suitable encryption, and hence may be only accessible by the proxy web server.

In some embodiments, credential data for authenticating user access to the trusted proxy web server may be generated using a secret scrambling algorithm located at a secure place such as an activation server that is used to activate the trusted device 300 for users. The complementary secret de-scrambling algorithm is stored inside the trusted device 300, or within the host client computer system. This algorithm protects the credential data for authenticating access to the trusted device from being directly accessible, for example through common operating systems (such as WINDOWS™, Unix, Linux, or MAC OSX).

Embodiments of the invention make it possible for an institution to use private algorithms for the generation and unscrambling of user credential data once the de-scrambling algorithm is loaded into the user's computing device. This enhances the security level for the local device and user authentication.

Advantageously none of the embodiments described require changes to be made to the authentication process used by the institution web server 120.

A further advantage of two-level authentication as described herein is that it avoids the deployment of a web-based authentication server for multi-factor authentication, thereby saving costs of maintaining such a third party server.

The institution may issue the trusted device 300 to the user, and provide a personal identification number (PIN) 140, which may be selected and changed by the user at the time of activation of the trusted device 300.

A user-personalized credential code is generated either at the time of issuing the trusted device 300, or at a later time when the user first activates the trusted device 300, possibly remotely. The user-personalized credential code is generated by running a security algorithm with the input combination of user selectable PIN, and the global unique identifier (UID) 310 of the trusted device 300. In some embodiments, one or more extra parameters are used. For example, a user name might be used in cases where more than one user is expected and permitted to use the token. In some embodiments, the institution uses a private (trade secret) security algorithm.

In embodiments where the trusted device is not a physical token but rather is a separate computing device, such as a PDA or data-enabled cell-phone, an institution trusted secret algorithm may be provided to generate the UID using the hard-coded information of the separate computing device. This ensures that the institution has access to the global unique identifier within the device to enable generation of the user-personalized credential code. This ensures that the trusted proxy service of the trusted device is associated with the separate device. This physical device then becomes a personal trusted digital device. More specifically, the unique hard-code identification information of the separate computing device, combined with the institution authorized secret algorithm means that the personal digital device becomes an institution trusted device. The access credentials for accessing the trusted device, is based on the hard-coded identification information of the trusted device, whether a separate physical device or a separate computing device, and the user selectable PIN. Thus in order to authenticate access to the trusted device, the authentication algorithm receives the user PIN, retrieves the hard-coded identification information from the device and regenerates the access credentials, which are then checked against the access credentials generated at the time of activating the device. If the two access credentials match, then both the user and the device are trusted.

In embodiments where the trusted device 300 is not activated at the institution, the user may remotely invoke the activation via a secure on-line channel provided between the institution's activation server and the user's computer. The user personalized credential code is generated at the institution and sent back via the secure on-line channel. It is then stored in the trusted device 300 together with the institution-authorized trusted proxy service for use in implementing the trusted proxy web server within the client computing platform 170. Note that this activation transaction is required only once (or only when reactivation is needed), and not for every transaction.

During on-line service transactions, the following level 1 authentication proxy function steps are undertaken:

The user logically attaches the trusted device to a client computing platform (factor 1 of the T-FA).

The user launches a browser that is configured to use the proxy web server, implementing the trusted proxy service code of the trusted device 300, and access a network location of the institution through the proxy web server.

The user inputs the PIN that they selected during the activation of the trusted device (factor 2 of the T-FA)

The proxy web server of the trusted device authenticates the user's access to the proxy web server using the global UID of the trusted device, and the user PIN, together with any optional extra factors.

If authentication is passed, the transaction passes level 1 authentication and the user is authenticated to access the proxy web server of the trusted device.

Once level 1 authentication is successfully completed, a level 2 institution-authorized authentication begins. The proxy web server begins authentication with the institution based on the user account information such as an account number and password, stored on the trusted device. This makes use of the standard on-line authentication process already in place.

The use of the trusted device 300 advantageously reduces the need for processes such as password resets that are based on answering a number of questions, since these questions often have answers that can be obtained by a third party using data-mining techniques, or even guessed. The trusted device 300 provides strong authentication (multi-factor authentication) for increased protection for sensitive information than a simple username and password can provide, and provides a strong assurance that transactions are conducted by known and trusted parties.

The level 1 trusted device authentication dramatically reduces authentication overhead for multi-factor authentications, since this screening authentication is performed on the client computing platform. The level 2 authentication is user-only authentication using the account ID and password. All user identification for performing level 2 authentication, such as account ID and password, is stored in the trusted device in encrypted form using institution-authorized algorithms. This encrypted user identification information can only be extracted after level 1 authentication is successful. Based on this functionality, the level 1 T-FA can be considered an online service firewall which prevents illegal users from accessing the institution web server.

It will be appreciated that the proxy web server may modify login web pages so that user account information is only displayed to the user in the form of aliases, the genuine ones being stored and used within the proxy web server. Level 2 authentication is automatically completed without any input from the user. This allows for enhancement of the security of authentication, as described below in further embodiments, without complicating the user experience. Alternatively the proxy web server may display a trusted device authentication page prior to allowing any traffic to be processed by the proxy web server. Furthermore, the proxy web server provided by the trusted device may only process the information to or from network locations for which it includes access credentials.

In some embodiments, the proxy web server may not insert user aliases (user ID and password) in the page received from the institution. Rather the proxy web server may passively monitor packets sent from the browser to the institution and check whether the aliases of the user ID and password are found in the packet(s). If yes, it replaces the aliases with the actual userID and password that have been associated with the aliases. In this way, the user is able to create aliases associated with their userID and password and use these aliases to fill in the login form. In addition to the userID and password aliases, this method can be used for any critical IDs such as credit card numbers for secure online accesses. The user may save his/her credit card number(s) into the trusted proxy and assign a relevant alias (es) to them. During online payment, the user can fill the credit card number with the alias, as well as any other information required by the online payment form. After submitting the payment form, the trusted proxy web server can automatically detect the user's credit card alias and replace the detected alias with the associated real card number. As a result, the real credit card number is not input into the browser, and so theft of the credit card number from malware in the browser is prevented.

In some embodiments, to further enhance level 2 authentication, an automatic One-Time-Password (OTP) function is provided. This is sometimes termed "single session password". In addition to the proxy web server, the trusted device is provided with an OTP Identity Manager (OTPIM) module.

The OTP mechanism may automatically change a user's password for access the institution network location.

The OTP function proceeds as follows:

Packet inspection performed by the proxy web server to capture any interesting site managed by the trusted proxy server. Proxy server detects that the level 2 authentication is complete Start OTPIM for automatically generating a new password and Start Password auto-change.

In other embodiments, the light-weight local proxy web server provides a "security watch dog" mechanism controlled by the user. The browser's proxy setting is configured to securely redirect the traffic through this local trusted proxy web server. The proxy web server filters the packets from the browser and passes them to the OTPIM for further processing. After processing, packets are relayed to the institution web server. Packets from a remote server are filtered out for further processing and then forwarded to the local browser.

The One-Time-Password Identity Manager (OTPIM) module may perform the following functions:

User accounts management:

Maintains existing accounts for various institutions that are using the trusted device authentication process described herein, with minimum information such as account ID, login URL, change password URL, current password, and the last password. In some embodiments it may also hold secret questions and their answers, etc. It also pre-stores custom formats of related login and change password pages for each institution it is capable of authenticating a user for.

To add a new account: the user is required to enter the following data:

a. Account ID: e.g. Username/card ID/account ID b. Password: Current (valid) login password c. Alias of the account: optional for convenience The login URL/password change URL can be preset in a configuration file since it will be the same for all users of a service providing institution, and so they can be added for the institutions making use of the trusted device described herein.

Auto level 2 login:

After successfully launching the starting program such as the browser 105, and passing the level 1 authentication, the user's account information alias is displayed in the GUI, (such as a web browser window). The institution login page is relayed to the browser and the user clicks an appropriate location, such as a submit button, to submit the login request to the institution. The login request from the browser is intercepted at the proxy web server and the alias IDs (aliases of account ID and/password) are replaced with genuine IDs taken from the managed user account information stored in the trusted device. The updated login request is sent to the institution web server for authentication. Some embodiments allow the incorporation of several accounts such as banking, email, etc. In these, the user selects an account and the OTPIM starts the appropriate login sequence. Alternatively, the OTPIM may automatically select the correct login sequence based on the URL of the network location being accessed. In some embodiments the following procedure is followed:

1. Launch a local browser which is configured to access the proxy web server and which in turn acts as a security watch dog, with URL pointed to the account login URL of the institution web server.
2. The browser connects to the target institution web server through the proxy web server.
3. The login page from the institution web server arrives at the proxy web server and is passed to the OTPIM.
4. The OTPIM searches the received login page information and locates within it the HTML <form> tag. It performs the following operations within the <form> tag:
    a. Locate the account ID field, (in some embodiments it is an "<input>" tag with type set to "text"), and insert value="account ID alias" inside the input tag
    b. Find the password field, (in some embodiments it is an <input> tag with type set to "password") and search for "value" attribute within the tag, randomly generate a password tag or use a preset password tag (passtag) and set the attribute value of the password <input> to passtag, which may be associated with the current password if multiple previously used passwords are stored, value="passtag"
5. The OTPIM returns the filled login page to the proxy web server which in turn forwards it to the browser for display to the user.
6. The user performs a single click from the login page to submit the login request.
7. The login request from the browser, including the filled account and password information, is sent to the proxy web server and is filtered out by the proxy web server. It is then passed to the OTPIM to replace the account ID alias and passTag alias with the correct account ID and the real password.
8. The login request with the real account ID and password is returned to the proxy web server which in turn delivers it to the institution web server.
9. The institution web server receives the login request with a correct account ID and password, loads the account information and sends the login response account information to the user via the proxy web service.

In other embodiments the procedures may be customised or modified to take account of variations in form design, password formatting, etc. Persons skilled in the art will appreciate that numerous different implementations of the OTPIM used by the proxy server of the trusted device are possible.

Auto OTP password change

After successful login to an institution account, the OTPIM automatically starts a change password session (running in the background). The steps are as follows:

1. Request password change web page through the proxy server with a change password URL associated with the account
2. The proxy server sends the request to the institution web server.
3. The institution web server responds with the password change web page. It is filtered by the proxy web server and passed to OTPIM
4. OTPIM generates a new random password and searches for <input> tag with type attribute set to "password" in the form:
    a. First <input> is the current password field: Insert the current password inside the <input> tag
    b. Second <input> is the new password field: Insert the newly generated random password in this <input> tag.
    c. Third <input> is the confirmation of the new password: Insert the newly generated random password in this <input> tag.
    In some embodiments there may be just two input password fields in which case the current password is not included in the page. In other embodiments the procedures are customised or modified to take account of variations in form design, password formatting, etc.
5. The institution web server receives the response and updates the password for the account and then sends back confirmation of the password change result.
6. The confirmation page is filtered out by the proxy web server and passed to OTPIM
7. OTPIM verifies the result and then stores both the current login password and the next time login password. All of the account information is then encrypted and saved within the trusted device.

The password change can also be user driven auto-change by configuring the password change policy to user driven. In this case, the procedure is as follows 1. The user clicks "Change Password" selection from the web site.
2. The remote web server responds with the password change page.
3. The password change page is filtered at the proxy web server and passed to OTPIM and the password change form is filled with random aliases but recorded. The OTPIM returns the filled page to the proxy web server for transmission to the user browser.

4. The user sees a filled password change page and just needs to click on a submit button (or equivalent) to submit the form.
5. The proxy web server filters out the submitted form and passes it to OTPIM which replaces the aliases with the real current password. The OTPIM generates a new password based on password policy and fills it into the new password and confirmation fields in the form. The OTPIM then returns the modified form to the proxy web server.
6. The proxy web server relays the updated password change request packet to the remote web server.

Both forms of password automation greatly reduce user effort in managing frequently changed passwords.

Figure 4:
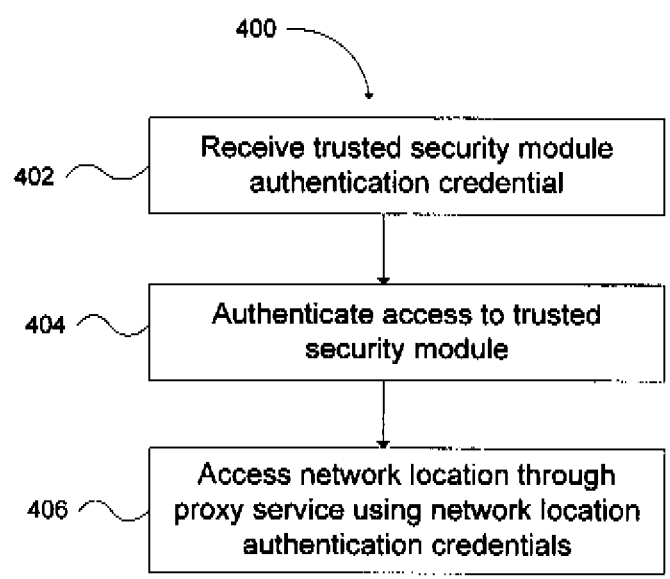
FIG. 4 shows in a flowchart a method of securely authenticating access to a network location.

FIG. 4 shows in a flowchart a method of securely authenticating access to a network location. The method 400 comprises receiving a trusted security module authentication credential (402). The trusted security module authentication credential is received at a trusted security module. Access to the trusted security module is the authenticated (404) using the received trusted security module authentication credentials. The network location may then be accessed using a trusted proxy service of the trusted security module and network location authentication credentials (406). The authentication credentials may be stored in the trusted security module when the access to the trusted security module has been authenticated.

The trusted security device has been described above. In another illustrative embodiment the trusted device does not take the form of a separate physical token, but rather the client computing platform itself incorporates the trusted security module which may include code to provide a proxy service for accessing a network location, such as a web page of a financial institution. The trusted security module may also comprise authentication credentials for use by the proxy service for authenticating access to the network location as well as trusted security module credentials for authenticating access to the proxy service of the trusted security module. The trusted security module may also include a global unique identifier UID 310, generated from one or more pieces of data within the client computing platform and its components.

Figure 5:
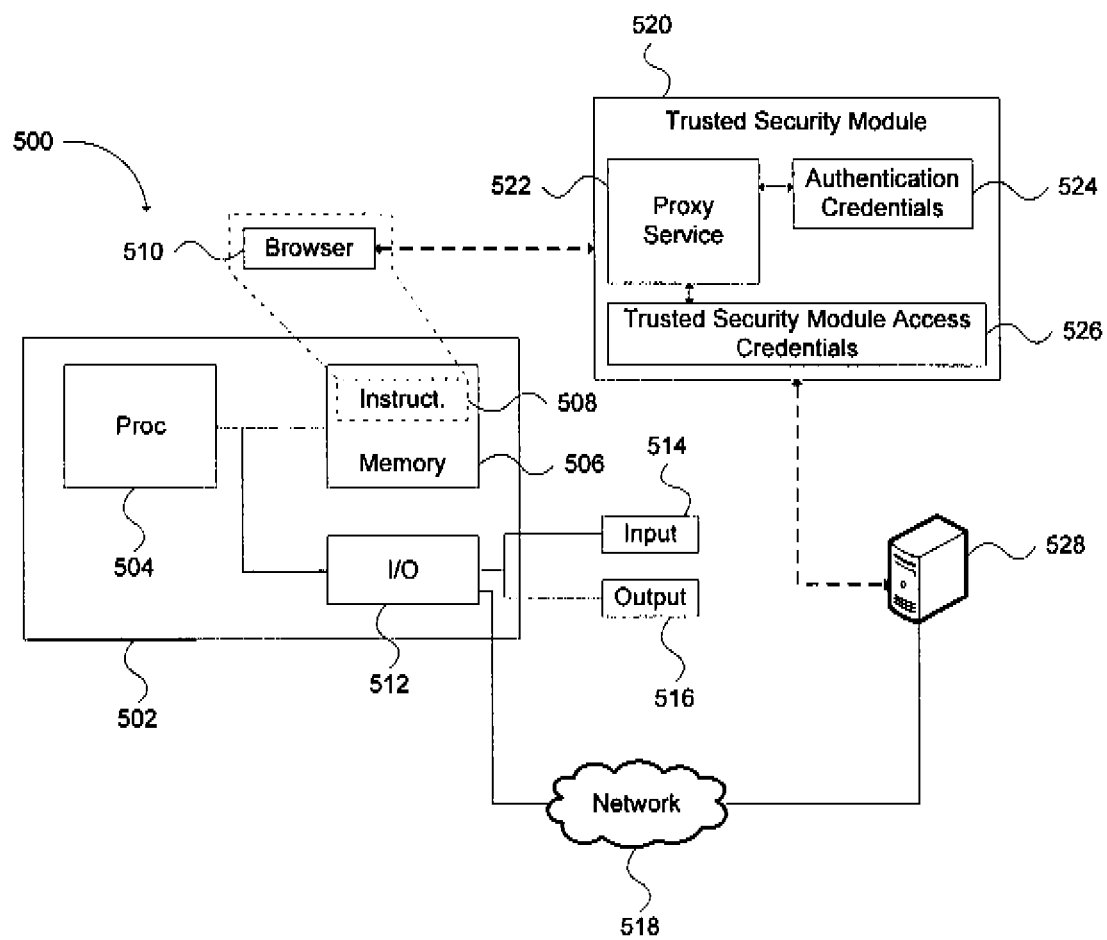
FIG. 5 shows a schematic of an authentication system using a trusted security module.

FIG. 5 shows a schematic of an authentication system using a trusted security module. The authentication system 500 comprises a client computing device 502 comprising a processor 504 coupled to a computer readable memory 506 storing instructions 508 for execution by the processor 504. The client computing device 502 further comprises an input/output (I/O) module 512 coupled to the processor 502. The I/O module 512 may be connected to both input devices 514 and output devices 516. The input devices 514 may include for example, a keyboard, mouse or other input devices such as a camera or microphone. The output devices 516 may include for example, a display screen or other output devices such as a speaker. The I/O device 512 may also be couple to other I/O devices such as a network adapter for transferring information over a network 518. The client computing device 502 is depicted as being coupled to an external network location 528 over the network 518. The network location 528 may include for example a banking or financial web site, or other site to which a user logs in and is authenticated using some form of credentials such as a username/password combination. When the instructions 508 stored in memory 506 are executed by the processor 504, they configure the client computing device to provide a browser 510 for accessing the external network location 528.

The authentication system 500 further comprises a trusted security module 520. The trusted security module may provide the client computing device with the functionality of the trusted security device described above. The trusted security module 520 includes instructions for providing a proxy service that the browser 510 can connect to and access the network location 528 through. The trusted security module 520 also includes trusted security module credentials 526 that allow access to the trusted security module 520 to be authenticated to ensure the user is authorized to use the proxy service 522 to access the network location 528. The trusted security module 520 further comprises network location authentication credentials 524 that are used by the network location to authenticate access to the network location 528 by the user. The trusted authentication credentials 524 may comprise a username/password combination used by the network location 528 to authenticate the user's access.

When a user wants to securely access the network location 528, such as a financial institution's online banking site, the user directs the browser 510 to access the network location 528 through the proxy service 522 of the trusted security module 520. The trusted security module 520 requires that the user input trusted security module authorization information to authenticate that the user is authorized to access the trusted security module 520. The input trusted security module authorization information is then authenticated against the trusted security module credentials 526 of the trusted security module 520. The trusted security module credentials 526 of the trusted module may be generated from a unique identifier generated from hard-coded parameters of the client device 102 and the user selected trusted security module authorization information, which may comprise a PIN or username password combination. When authenticating access to the trusted security module 526, the trusted security module generates the unique identifier from the client device 502 and combines it with the user inputted trusted security module authorization information to generate an access credential. If the generated access credential matches the trusted security module credentials 526 of the trusted security module 520, the security module authenticates access for the user, since the user input the correct authorization information, and the trusted security module is associated with the same client device 502 that was used when originally generating the trusted security module credentials 526.

If the user is authenticated to access the trusted security module 520, the proxy service 522 of the trusted security module is used to access the network location 528. Access to the network location 528 is authenticated using the network location authentication credentials 524 stored in the trusted security module 520. If the network location authenticates the access the network location may then provide the desired web pages or information to the browser 510 through the proxy service 522. Advantageously, since the network location authentication credentials are stored in the trusted security module, a user does not need to input them into a browser and as such they are not at risk of being compromised.

The trusted device, or trusted security module, may also include a Message Integrity Checker (MIC) that can be used to check the integrity of messages sent by the local web browser. In one embodiment the Graphical User Interface GUI presented to the user consists of a web browser component such as Microsoft visual studio browser control. The submitted packets from the web browser are captured by the local trusted proxy web server and displayed in the GUI browser component allowing the user to verify the transaction.

In other embodiments, an in-line frame (IFrame) agent is created which behaves as a legal man-in-the-browser. It is used to establish a supervision channel to monitor the integrity of transaction data. The trusted local proxy web server receives two packets for the one submission from browser: one is from common communication channel and the other from the supervision channel. The proxy server performs a detailed comparison between these two packets to verify the data integrity.

Although the above description has described the use of the trusted security module 520 for accessing a single network location, it will be appreciated that the same trusted security module may be used for accessing a plurality of network locations. If the same trusted security module 520 is used to access a plurality of network locations, the trusted security module 520 must store network authentication credentials for each of the network locations. Furthermore, the trusted security module 520 must be able to determine which of the network location authentication credentials to use. This may be determined from the URL of the network address being accessed. Additionally or alternatively, the trusted security module access credentials may be modified to include an indication of which network location authentication credentials to use or a user may select them.

It will be appreciated that the trusted security module 520 may be implemented in various ways. As described above, the trusted security module 520 may be implemented in as a physical device, such as the trusted device 300 that is separate from the client device 502. If the trusted security module 520 is implemented as a separate external device such as trusted device 300 it may include a USB token, USB flash drive, Bluetooth token, cellular phone, smart phone or other mobile device, which may be coupled either by wires or wirelessly to the client computing device 502. Alternatively the security module 520 may be implemented as part of the client computer, either as an additional hardware component, or alternatively as instructions and data stored in the memory 506 of the client computing device 502. Further still the trusted security module 520 may be distributed on a computer readable medium for implementing the trusted security module 520, wither within a client device 502 or on an external physical device. If the trusted security module 520 is distributed on a computer readable medium, it may include additional instructions for generating the trusted security module credentials 526 for an associated client device 502.

Many client computing platforms 100, exemplified by personal computers (PCs), personal digital assistants (PDAs) and Smart phones, already have global unique identifiers embedded in them, or have the ability to generate such an identifier, derived from hard-coded attributes of an integral hardware device or component. PC Ethernet ports have a globally unique Medium Access Control (MAC) address, for example. Therefore, in these and similar cases, a physical token is not required.

The functions described allow institutions to establish and maintain communication paths across the web to their users with various combinations of those functions brokering a level of trust appropriate to the transactions required

What is claimed is:

1. A method for trusted secure access from a local network location to an institution remote network location, comprising:
   employing at least one processor for:
   (a) activating a trusted security device at a local network location, said device having a non-transitory computer readable storage medium, with a remote network location, comprising:
   at the local network location:
   (i) obtaining, from the remote network location, an institution authorized a private security software comprising a scrambling algorithm and a descrambling algorithm, and storing the private security software at the trusted security device; the trusted security device having a un-changeable global unique identifier (UID), which uniquely identifies the trusted security device;
   (ii) causing the private security software to:
   (ii-1) obtain a user selectable personal identification number from a user;
   (ii-2) obtain the UID from the trusted security device; and
   (ii-3) forward the PIN and the UID to the remote network location; at the remote network location:
   (iii) running the scrambling algorithm with the PIN and UID as input to generate a user-personalized credential code containing scrambled access credentials to the institution remote location; and
   (iv) forwarding the user-personalized credential code to the local network location and storing thereof at the trusted security device; and
   (b) at the local network location, performing a local authentication without communicating over any network, comprising:
   (v) verifying authenticity of the user selectable PIN and the UID, comprising running the descrambling algorithm of the private security software using the PIN and the UID as input to descramble the user- personalized credential code;
   (vi) upon successful verification, retrieving the access credentials to the institution remote network location from the user-personalized credential code.

2. The method of claim 1, wherein the remote network location is one of the following:
   a third party network location; or
   the institution network location.

3. The method of claim 1, wherein the step (ii-2) comprises generating the UID using a device identity information hard-coded into a hardware of the trusted security device.

4. The method of claim 1, further comprising storing the user selectable PIN, the UID, the user-personalized credential code, the access credentials to the institution remote network location, or a combination thereof, in a database stored in the non-transitory computer readable storage medium of the trusted security device.

5. The method of claim 4, further comprising:
   encrypting the database so that the database is only accessible by a trusted proxy server at the local network location; and
   storing an algorithm for decrypting the database in the non-transitory computer readable medium of the trusted security device.

6. The method of claim 1, further comprising, upon the local authenticating, automatically forwarding the access credentials to the institution remote network location for authenticating the user with the institution remote network location and requesting service from the institution remote network location.

7. The method of claim 1, wherein the access credentials to the institution remote network location comprise a one-time password, which is changed every time when the access to the institution remote network location is requested.

8. The method of claim 1, wherein the trusted security device is one of the following:
   a computing device, comprising a processor, at the local network location; or
   a portable device having memory, which is different from the computing device, and which is coupled to the computing device.

9. The method of claim 8, wherein the computing device comprises a mobile wireless device.

10. A system for providing a trusted secure access in a computer network from a local network location to an institution remote network location, the system comprising: a computing device at the local network location, the computing device having a processor;
   a remote server computer at a remote location;
   a trusted security device at the local network location to be activated with the remote server computer;
   the computing device comprising a computer readable medium having computer readable instructions stored thereon for execution by the processor, causing the processor to:
   (i) obtain, from the remote server computer,--a an institution authorized private security software comprising a scrambling algorithm and a descrambling algorithm, and store the private security software at the trusted security device;
   the trusted security device having a un-changeable global unique identifier (UID), which uniquely identifies the trusted security device;
   (ii) cause the private security software to:
   (ii-1) obtain a user selectable personal identification number (PIN) from a user;
   (ii-2) obtain the UID from the trusted security device; and
   (ii-3) forward the PIN;.and the UID to the remote network location; the remote server computer having memory having computer readable instructions stored thereon, causing the remote server computer to:
   (iii) run the scrambling algorithm of the private security software with the PIN and the UID as input to generate a user-personalized credential code containing scrambled access credentials to the institution remote location; and
   (iv) forward the user-personalized credential code to the computing device and store thereof at the trusted security device; and
   (b) the computer readable instructions of the computing device being further configured to, without communicating over any network, cause the processor to:
   (v) verify authenticity of the user selectable PIN and the UID, comprising running the descrambling algorithm using the PIN and the UID as input to descramble the user personalized credential code;
   (vi) upon successful verification, retrieve access credentials, providing access to the institution remote network location, from the user-personalized credential code.

11. The system of claim 10, wherein the remote network location is one of the following:
   a third party network location; or
   the institution network location.

12. The system of claim 10, wherein the computer readable instructions of the computing device are further configured to cause the processor to generate the UID using a device identity information hard-coded into a hardware of the trusted security device.

13. The system of claim 10, wherein the computer readable instructions of the computing device are further configured to cause the processor to store the user selectable PIN, the UID, the user-personalized credential code, the access credentials to the institution remote network location, or a combination thereof, in a database stored in a non-transitory computer readable storage medium of the trusted security device.

14. The system of claim 13, wherein the computer readable instructions of the computing device are further configured to cause the processor to encrypt the database so that the database is only accessible by a trusted proxy server at the local network location, and to store an algorithm for decrypting the database in the non-transitory computer readable medium of the trusted security device.

15. The system of claim 10, wherein the computer readable instructions of the computing device further cause the processor to automatically forward, upon the successful verification, the access credentials to the institution remote server computer for authenticating the user with the institution remote server computer and for requesting service from the institution remote server computer.

16. The system of claim 10, wherein the access credentials to the institution remote network location comprise a one-time password, which is changed every time upon requesting the access to the institution remote server computer.

17. The system of claim 1, wherein the trusted security device is one of the following:
   a computing device, comprising a processor, at the local network location; or
   a portable device having memory, which is different from the computing device, and which is coupled to the computing device.

18. The system of claim 8, wherein the computing device comprises a mobile wireless device.

19. The method of claim 7, wherein the one-time password is a random string.

20. The system of claim 10, wherein the one-time password is a random string.

* * * * *

UNITED STATES PATENT AND TRADEMARK OFFICE
CERTIFICATE OF CORRECTION

PATENT NO. : 8,510,811 B2
APPLICATION NO. : 12/639464
DATED : August 13, 2013
INVENTOR(S) : Randy Kuang et al.

It is certified that error appears in the above-identified patent and that said Letters Patent is hereby corrected as shown below:

In the Claims:

Claim 10, Column 15, line 15, "--a an" should read --an--.

Claim 10, Column 15, line 20, "a un-changeable" should read --an un-changeable--.

Signed and Sealed this
Eighth Day of October, 2013

Teresa Stanek Rea
*Deputy Director of the United States Patent and Trademark Office*